(12) United States Patent
Lokeswarappa et al.

(10) Patent No.: US 10,319,250 B2
(45) Date of Patent: Jun. 11, 2019

(54) PRONUNCIATION GUIDED BY AUTOMATIC SPEECH RECOGNITION

(71) Applicant: SoundHound, Inc., Santa Clara, CA (US)

(72) Inventors: Kiran Garaga Lokeswarappa, Mountain View, CA (US); Jonah Probell, Alviso, CA (US)

(73) Assignee: SOUNDHOUND, INC., Santa Clara, CA (US)

( * ) Notice: Subject to any disclaimer, the term of this patent is extended or adjusted under 35 U.S.C. 154(b) by 13 days.

(21) Appl. No.: 15/439,883

(22) Filed: Feb. 22, 2017

(65) Prior Publication Data
US 2018/0190269 A1   Jul. 5, 2018

Related U.S. Application Data

(60) Provisional application No. 62/440,254, filed on Dec. 29, 2016.

(51) Int. Cl.
*G10L 15/06*   (2013.01)
*G09B 5/04*   (2006.01)
(Continued)

(52) U.S. Cl.
CPC ............... *G09B 5/04* (2013.01); *G09B 19/06* (2013.01); *G10L 13/00* (2013.01); *G10L 15/26* (2013.01); *G10L 2015/225* (2013.01)

(58) Field of Classification Search
CPC ..... G10L 13/08; G10L 15/063; G10L 15/187; G10L 15/26; G09B 19/04; G09B 19/06;
(Continued)

(56) References Cited

U.S. PATENT DOCUMENTS 5,393,236 A * 2/1995 Blackmer ............... G09B 7/04
434/169
5,857,173 A    1/1999 Beard et al.
(Continued)

OTHER PUBLICATIONS

Mukul Vinay Lele, Adobe Captivate Blog, Customizing Text to Speech Pronounciations, Mar. 20, 2009, Adobe.
(Continued)

*Primary Examiner* — Vijay B Chawan
(74) *Attorney, Agent, or Firm* — Dana Legal Services

(57) ABSTRACT

Speech synthesis chooses pronunciations of words with multiple acceptable pronunciations based on an indication of a personal, class-based, or global preference or an intended non-preferred pronunciation. A speaker's words can be parroted back on personal devices using preferred pronunciations for accent training. Degrees of pronunciation error are computed and indicated to the user in a visual transcription or audibly as word emphasis in parroted speech. Systems can use sets of phonemes extended beyond those generally recognized for a language. Speakers are classified in order to choose specific phonetic dictionaries or adapt global ones. User profiles maintain lists of which pronunciations are preferred among ones acceptable for words with multiple recognized pronunciations. Systems use multiple correlations of word preferences across users to predict use preferences of unlisted words. Speaker-preferred pronunciations are used to weight the scores of transcription hypotheses based on phoneme sequence hypotheses in speech engines.

21 Claims, 20 Drawing Sheets

(51) Int. Cl.
*G09B 19/06* (2006.01)
*G10L 13/00* (2006.01)
*G10L 15/26* (2006.01)
*G10L 15/22* (2006.01)

(58) Field of Classification Search
CPC .......... G09B 5/06; G09B 7/02; G09B 21/006; G09B 5/065; G09B 7/04
USPC ....... 704/243, 254, 255, 260, 266, 231, 251, 704/270, 275, 3, 7; 434/185, 156, 169, 434/157, 308
See application file for complete search history.

(56) References Cited

U.S. PATENT DOCUMENTS

| | | | | |
|---|---|---|---|---|
| 5,885,083 A * | 3/1999 | Ferrell | ................ | G09B 5/065 434/156 |
| 6,078,885 A | 6/2000 | Beutnagel | | |
| 6,092,044 A | 7/2000 | Baker et al. | | |
| 7,472,061 B1 * | 12/2008 | Alewine | ................ | G10L 13/08 704/243 |
| 7,957,969 B2 * | 6/2011 | Alewine | ................ | G10L 13/08 704/243 |
| 8,033,831 B2 * | 10/2011 | Julia | ................ | G09B 7/02 434/185 |
| 8,275,621 B2 * | 9/2012 | Alewine | ................ | G10L 13/08 704/231 |
| 2003/0130847 A1 | 7/2003 | Case | | |
| 2003/0182111 A1 | 9/2003 | Handal et al. | | |
| 2006/0041431 A1 * | 2/2006 | Maes | ................ | G10L 15/30 704/270.1 |
| 2006/0057545 A1 * | 3/2006 | Mozer | ................ | G09B 5/06 434/156 |
| 2006/0110711 A1 * | 5/2006 | Julia | ................ | G09B 7/02 434/156 |
| 2006/0110712 A1 * | 5/2006 | Julia | ................ | G09B 7/02 434/156 |
| 2006/0149558 A1 * | 7/2006 | Kahn | ................ | G10L 15/063 704/278 |
| 2007/0100602 A1 | 5/2007 | Kim | | |
| 2009/0004633 A1 * | 1/2009 | Johnson | ................ | G09B 19/04 434/169 |
| 2009/0006097 A1 | 1/2009 | Etezadi et al. | | |
| 2009/0248395 A1 * | 10/2009 | Alewine | ................ | G10L 13/08 704/7 |
| 2011/0165912 A1 | 7/2011 | Wang et al. | | |
| 2011/0218806 A1 * | 9/2011 | Alewine | ................ | G10L 13/08 704/251 |
| 2012/0322035 A1 * | 12/2012 | Julia | ................ | G09B 5/06 434/185 |
| 2014/0220520 A1 * | 8/2014 | Salamini | ................ | A61B 5/103 434/185 |
| 2014/0278421 A1 | 9/2014 | Komissarchik et al. | | |
| 2014/0365216 A1 | 12/2014 | Gruber et al. | | |

OTHER PUBLICATIONS

Thomas Hain, Implicit modelling of pronunciation variation in automatic speech recognition, Speech Communication, Mar. 2005, 171-188, Speech Communication 46, Elsevier.

Michael Pucher, et al., Regionalized Text-to-Speech Systems: Persona Design and Application Scenarios, Multimodal Signals, LNAI, 2009, pp. 216-222, Springer-Verlag, Berlin Heidelberg.

Timothymh, How to to specify pronunciations for OS X Lion?, Stackexchange, Mar. 29, 2012.

Terrence J. Sejnowski, et al., Parallel networks that Learn to Pronounce English Text, Complex Systems, 1987, pp. 145-168.

Zi-Rong Zhang, et al., An Efficient Way to Learn Rules for Grapheme-to-Phoneme Conversion in Chinese, Microsoft Research Asia, Beijing, The 5th International Symposium on Chinese Spoken Language Processing, Dec. 13-16, 2006, Singapore.

Freddy William, et al., Automatic Accent Assessment Using Phonetic Mismatch and Human Perception, IEEE Transactions on Audio, Speech, and Language Processing, vol. 21, No. 9, Apr. 12, 2013.

Sue Smith, Android SDK: Build a Speak and Repeat App, tuts+, Jun. 19, 2012, https://code.tutsplus.com/tutorials/androidsdkbuildaspeakandrepeatappmobile11197.

Speech Synthesis in OS X, developer.apple.com, https://developer.apple.com/library/content/documentation/UserExperience/Conceptual/SpeechSynthesisProgrammingGuide/SpeechOverview/SpeechOverview.html#//apple_ref/doc/uid/TP40004365-CH3-SW5.

* cited by examiner

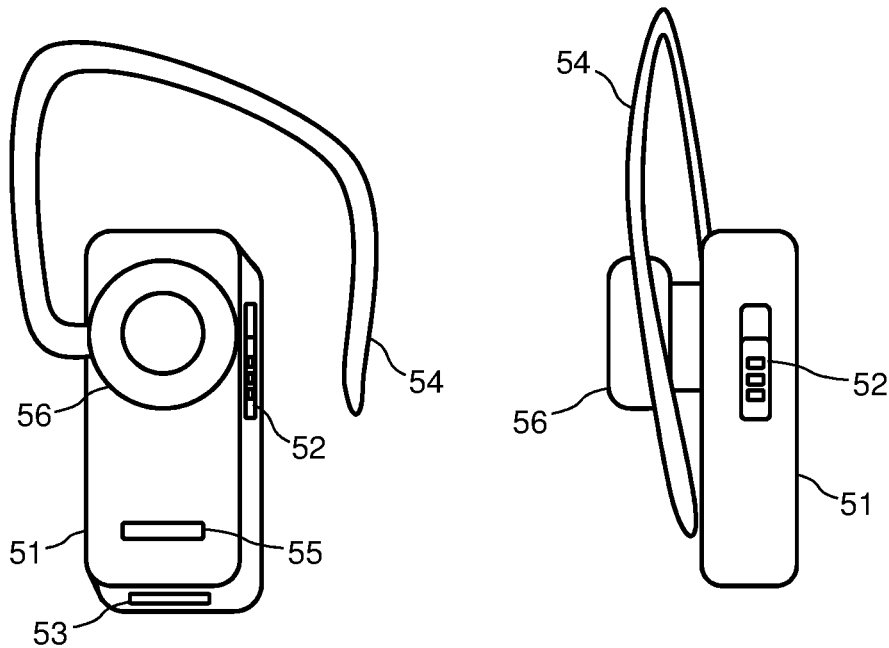
FIG. 5A
FIG. 5B
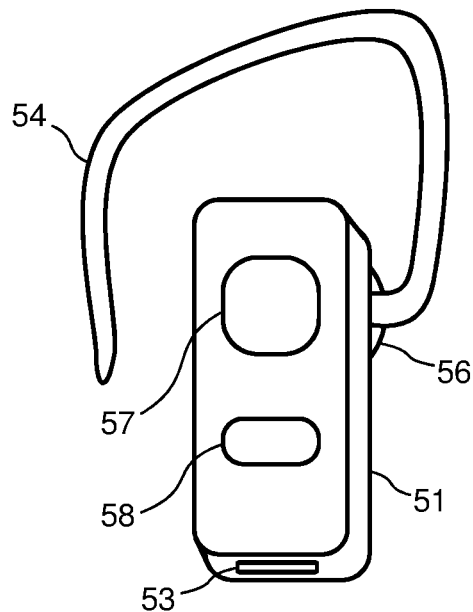
FIG. 5C

American English phonetic dictionary

```
aunt:0 AE N T
aunt:1 AO N T
bill B IH L
wine W AY N
```
~81

Indian English phonetic dictionary

```
aunt   AO N T
bill   B IH L
wine:0 W AY N
wine:1 V AY N
```
~82

Chinese English phonetic dictionary

```
aunt   AO N T
bill:0 B IH L
bill:1 B IY R
wine   W AY N
```
~83

FIG. 8

American English phonetic dictionary

```
aunt:0 AE N T
aunt:1 AO N T
for:0 F AO R
for:1 F ER
for:2 F R ER
good:0 G UH D
good:1 G IH D
likes L AY K S
my M AY
tomatoes:0 T AH M EY T OW Z
tomatoes:1 T AH M AA T OW Z
your:0 Y AO R
your:1 Y UH R
```
— 101 text + pronunciation indicators

`my aunt:1 likes tomatoes:0` — 102 user profile word list

```
aunt:1
tomatoes:0
```
— 103 response text

`good for your aunt` — 104 response phonemes

`G UH D   F AO R   Y AO R   AO N T` — 105

FIG. 10 pronunciation correlation data

```
aunt:0 AE N T
   tomatoes:0 T AH M EY T OW Z .8
   tomatoes:1 T AH M AA T OW Z .2 aunt:1 AO N T
   tomatoes:0 T AH M EY T OW Z .45
   tomatoes:1 T AH M AA T OW Z .55
```
~131 user profile word list

`aunt:1` ~132 response text

`tomatoes` ~133 response phonemes

```
AA as in odd
AE as in at
AH as in hut
AO as in ought
AW as in cow
AY as in hide
B  as in be
CH as in cheese
D  as in dee
DH as in thee
EH as in Ed
ER as in hurt
EY as in ate
F  as in fee
G  as in green
HH as in he
IH as in it
IY as in eat
JH as in gee
K  as in key
L  as in lee
M  as in me
N  as in knee
NG as in ping
OW as in oat
OY as in toy
P  as in pee
R  as in read
S  as in sea
SH as in she
T  as in tea
TH as in theta
UH as in hood
UW as in two
V  as in vee
W  as in we
Y  as in yield
Z  as in zee
ZH as in seizure
```
160

FIG. 16

PRONUNCIATION GUIDED BY AUTOMATIC SPEECH RECOGNITION

This application claims the benefit of U.S. Application No. 62/440,254, filed on Dec. 29, 2016 and entitled PRONUNCIATION GUIDED BY AUTOMATIC SPEECH RECOGNITION, which is hereby incorporated by reference.

FIELD OF THE INVENTION

The present invention is in the field of computer systems and, more specifically, to systems that use automatic speech recognition with phonetic dictionaries to communicate using select pronunciations.

BACKGROUND

The Carnegie Mellon University (CMU) notation for English language phonemes include:
AA as in odd
AE as in at
AH as in hut
AO as in ought
AW as in cow
AY as in hide
B as in be
CH as in cheese
D as in dee
DH as in thee
EH as in Ed
ER as in hurt
EY as in ate
F as in fee
G as in green
HH as in he
IH as in it
IY as in eat
JH as in gee
K as in key
L as in lee
M as in me
N as in knee
NG as in ping
OW as in oat
OY as in toy
P as in pee
R as in read
S as in sea
SH as in she
T as in tea
TH as in theta
UH as in hood
UW as in two
V as in vee
W as in we
Y as in yield
Z as in zee
ZH as in seizure FIG. 16 shows a table of CMU notations of American English phonemes and example words.

Modern automatic speech recognition (ASR) technology is improving at an ability to recognize speakers' words, even when speakers have different accents and use different pronunciations of words. Some ASR systems are able to recognize both S AE N JH OW Z and S AA N HH OW S EY as the word "San Jose". Note that some words, such as "San Jose", contain multiple parts separate by a space. Some words include hyphens, such as "give-and-take". Some words are acronyms (pronounced as a word) and initialisms (pronounced letter by letter) that may alternatively be pronounced as individual letters or as if a spoken word, such as "MPEP", pronounced as EH M P IY IY P IY or EH M P EH P.

Many words have one strongly preferred pronunciation, such as "San Jose". Some words have multiple generally acceptable pronunciations, such as "tomato", for which pronunciations T AH M EY T OW and T AH M AA T OW are both generally acceptable. That fact was popularized in the song Let's Call the Whole Thing Off by George and Ira Gershwin. Such systems use a phonetic dictionary to map sequences of graphemes to phonemes. Many systems use proprietary phonetic dictionaries, but CMUdict from researchers at Carnegie Mellon University is a widely used and freely available one.

Some systems have speech synthesis functions that produce audio samples that, when sent to a digital to analog converter, amplifier, and played through a speaker produce speech back to users. They also use phonetic dictionaries, but with one sequence of phonemes for the pronunciation of each word. When they produce speech with a pronunciation that is unfamiliar to a user, it is either disconcerting for the user or completely misunderstood by the user. Either users need to figure out the system's pronunciation or designers need to design systems to use pronunciations that users expect. Designing such systems is impossible, particularly for words with multiple generally acceptable pronunciations. Therefore, what is needed is a system that can teach users common pronunciations and systems that can learn users' preferred pronunciations.

SUMMARY OF THE INVENTION

The present invention provides for systems to teach users common pronunciations and for users to teach systems their personally preferred pronunciations. Various forms of speech synthesis are appropriate. Text-to-speech (TTS) is commonly used, but other means are appropriate. Speech synthesis uses a phonetic dictionary of preferred pronunciations in order to produce speech output. The present invention, accordingly, is not abstract, but rather a specific improvement in the field of speech synthesis given the details provided with respect to the system and methods outlined. More specifically, in some embodiments, the preferred pronunciation phonetic dictionary has generally preferred pronunciations. When the system captures speech through ASR, it responds to the user with the preferred pronunciation.

A simple system receives and recognizes user speech to produce a transcription; detects an interruption point in the user speech, such as by using and end-of-utterance detection; then generates speech output from the transcription, doing so using the preferred pronunciations. As a result, users can hear their own words spoken back with preferred pronunciation. This is useful for training users in the system language.

In some embodiments, transcriptions are plain text strings. In some embodiments, transcriptions include special characters or escape codes to embed meta information. In some embodiments transcriptions are represented using a markup language such as Speech Synthesis Markup Language (SSML). Transcriptions might include transcription errors. Common causes of transcription errors are background noise during audio capture, distortion due to analog components or signal processing, loss of transmitted data, or unusual vocal characteristics of speakers, such as thick accents or young age. With most transcription errors, the generated speech output is obviously incorrect.

Many systems do more than provide language training to users by parroting their words. Many systems provide various useful results as output synthesized speech. Some examples are virtual assistants, navigation systems, telephone interactive voice response systems, automatic real-time language interpreters, voice-controlled music players, and interactive robots.

Some training systems allow for selection of different synthesized voices. Some training systems allow for different sets of preferred pronunciations, such as would be appropriate for different dialects. Some training systems indicate to the user which words the user spoke with a pronunciation other than the desired one. Such indications can be by color or weight of text in a visual transcription, by emphasizing in the synthesized speech the users' alternately pronounced word, or by other means of indicating particular words to a user.

Some training systems do ASR with an extended set of phonemes beyond those conventionally recognized in the system's spoken language. Some such systems indicate a degree of mispronunciation based on the distance of the recognized phonemes from those of the preferred pronunciation of words.

The invention is applicable within many physical devices. It can be implemented within general-purpose mobile phones, desktop computers, and servers, but also within specialized devices such as training school kiosks and small, power-optimized, wearable devices such as headsets.

Some embodiments classify users based on the pronunciations detected in their recognized speech. Some such systems include pre-defined classifications of dialects. Some such systems compute correlations between the pronunciation variations of particular words between users to classify users automatically. Classification can be either in groups or on a continuum in any number of dimensions.

Some classifications are based on, for example, a dozen or so regional variants, larger numbers of machine-learning-generated classes based on correlations between frequency of certain pronunciations across users, ethnic background, or socioeconomic status. Some embodiments perform classification by as little as a single words' pronunciation. Some embodiments perform classification on many words' pronunciations.

Some embodiments adapt to user speech. They identify, for words that have multiple acceptable pronunciations, which pronunciation speakers use. Such embodiments store lists of words and their user-preferred pronunciations. When speech synthesis uses a word, it chooses the preferred pronunciation. Pronunciations can be updated if a speaker uses the word again with a different pronunciation.

For words that a certain speaker has never spoken, some such systems identify preferred pronunciations of one or more other speakers who are classified the same as the certain speaker. Similarly, some systems predict preferred pronunciations for a certain user based on the preference of other users with a high degree of correlation, based on identified preferred word pronunciations, to the certain user.

Systems that store preferred pronunciations are able to learn the generally preferred pronunciations of proper nouns and abbreviations. By comparing preferred pronunciations across many users, such a system learns, and thereby it is able to provide training to other users.

BRIEF DESCRIPTION OF THE DRAWINGS

FIGS. 5A, 5B, and 5C illustrate a headset device, according to an embodiment of the invention.

FIG. 8 illustrates examples of dialect-specific phonetic dictionary entries, according to an embodiment of the invention.

FIG. 10 illustrates pronunciation representations at stages within a dialog scenario, according to an embodiment of the invention.

FIG. 13 illustrates pronunciation representations at stages within a dialog scenario using correlation-based prediction of preferred pronunciations, according to an embodiment of the invention.

FIG. 16 illustrates the CMU notation for English language phonemes, according to an embodiment of the invention.

DETAILED DESCRIPTION

All statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. It is noted that, as used herein, the singular forms "a," "an" and "the" include plural referents unless the context clearly dictates otherwise. Reference throughout this specification to "one aspect," "another aspect," "one embodiment," "an embodiment," "certain embodiment," or similar language means that a particular aspect, feature, structure, or characteristic described in connection with the embodiment is included in at least one embodiment of the invention. Thus, appearances of the phrases "in one embodiment," "in at least one embodiment," "in an embodiment," "in certain embodiments," and similar language throughout this specification may, but do not necessarily, all refer to the same embodiment or similar embodiments.

Figure 1:
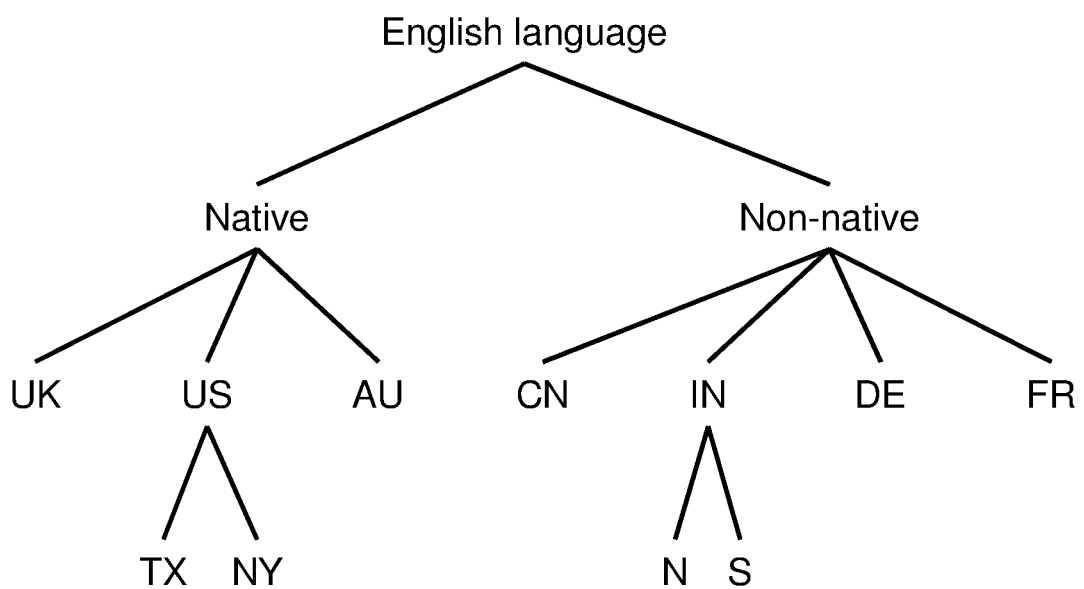
FIG. 1 illustrates a taxonomy of some English language dialects.

The present invention is applicable to essentially any human language. This disclosure uses English as an example. FIG. 1 shows a partial taxonomy of ethnic and regional dialects of the English language. Dialects and accents are either ones of native or non-native speakers. Among native English speakers, UK, US, and Australia have national dialects and accents. The US has distinct regional dialects and accents, such as ones from Texas and ones from New York. For non-native speakers, their native languages influence their English dialects and accents. Some examples are ones influenced by various Chinese languages, various Indian languages, German (DE), and French. Some such group of foreign native language influenced dialects and accents vary by region, such as ones of northern and ones of southern India. Some systems, according to the invention, can work with different phonetic dictionaries, each customized for a particular dialect and accent.

The invention is useful in cases where lexemes, or specifically their computer representations, correspond to multiple generally acceptable pronunciations. The word tomato is an example in English. In Mandarin Chinese, the character 暴 is an example. It is pronounced B OW as in the phrase 暴露, and it is pronounced P UW as in the phrase 地暴十寒. In Japanese, the character 大 is an example. It can be pronounced OW as in the word 大雨 OW AA M EY, but 大 can also be pronounced D AY as in the word 大合唱 D AY G AA S Y OW. In Korean, the particle 의 is an example. In the word 계산 it is pronounced 계, but in the word 계명 it pronounced like 게. In French, the word fils is an example. Fils, referring to male children is pronounced F IY S, and fils referring to fine strings is pronounced F IY L.

Training Systems

One embodiment of the invention is a system that performs a method that can be useful for training users to use standard pronunciations of words. The system captures the audio of speech until detecting an end-of-utterance (EOU). The system performs ASR on the speech audio to produce a textual transcription of the utterance. Some embodiments perform incremental ASR, which can give lower latency for responses because the system can do much of the processing before the EOU. Some embodiments perform ASR only after the EOU. With sufficient processing performance, this can allow for simpler ASR algorithms and potentially better results with temporally bi-direction algorithms.

After capturing an utterance up to an EOU, the system uses the transcription to synthesize speech audio using a desirable accent and voice, and generally preferred pronunciation of words. If, for example, a user says, "EH S S IY Y UW B IY EY IH N S AE N JH UW W AA N", the system produces a transcription, "SCUBA in San Juan", and produces speech audio output, "S K UW B AH IH N S AE N HH W AA N".

Some embodiments use a standard text representation, such as American Standard Code for Information Interchange (ASCII). Any other means of representing words is possible, such as by using machine learning to correlate audio segments with conceptual meanings. Some embodiments use traditional text-to-speech (TTS) algorithms based on either concatenation of speech samples or parametric synthesis. Some embodiments use mappings of concept representations to desirable output speech audio.

Figure 2:
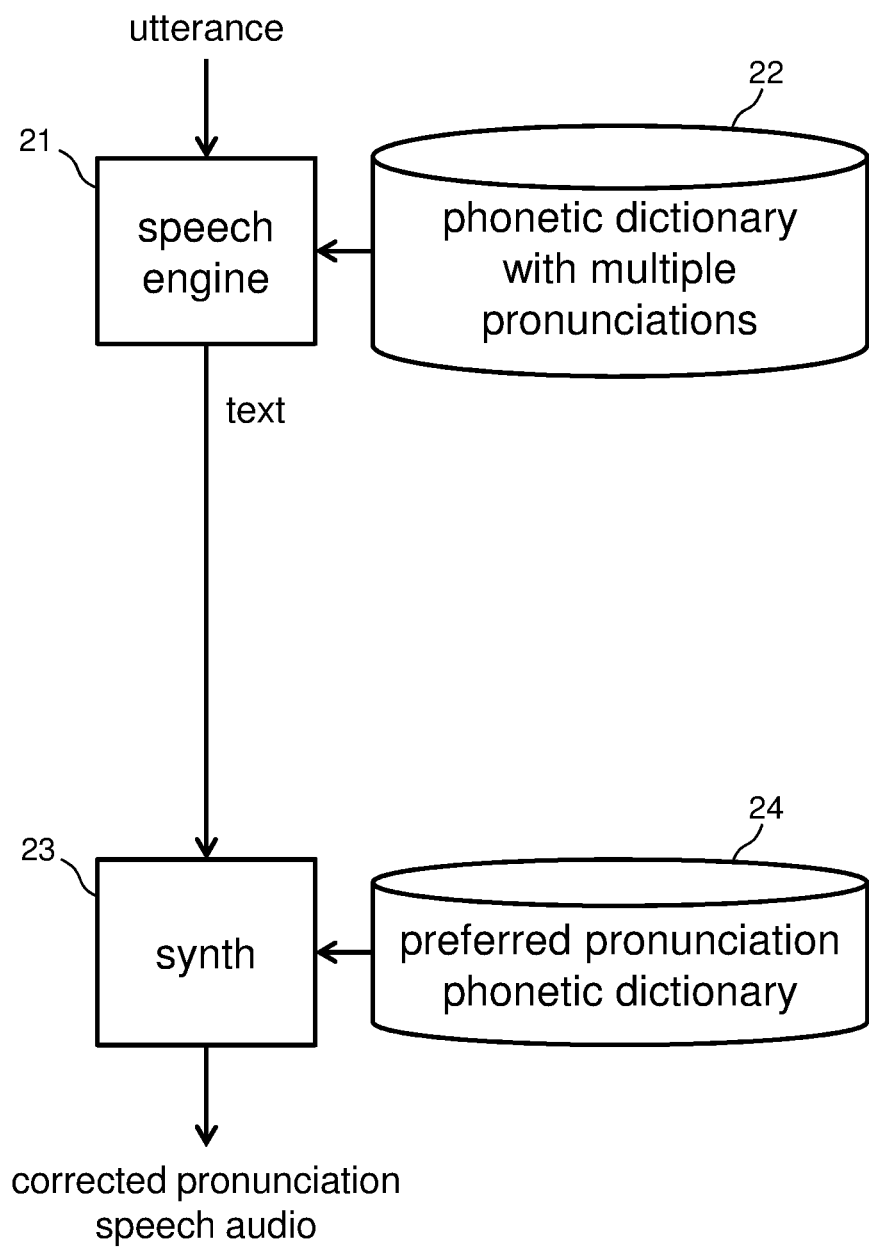
FIG. 2 illustrates a pronunciation training system according to an embodiment of the invention.

FIG. 2 shows an embodiment of the invention. A speech engine 21 produces a multiplicity of hypotheses of phoneme sequences. There are numerous types of speech engines that use such techniques as digital signal processing, neural networks, hidden Markov models, phoneme lattices, and other probabilistic techniques that tend to produce multiple hypotheses as to phoneme sequences. Typically, phoneme sequence hypotheses are accompanied by scores, and produced in the tens or hundreds at a time.

Speech engine 21 looks up mappings of words to phoneme sequences using a phonetic dictionary 22. Based on sequence hypotheses and their scores and what orders of phonemes match words in phonetic dictionary 22, the speech engine produces text that is the most likely hypothesis of what the user said. Speech engines are good, and improving, and can correctly transcribe what users say into text most of the time for even long sequences of words and for users with many kinds of voices, accents, and environments of background noise. Because many words have multiple acceptable pronunciations, phonetic dictionary 22 stores multiple pronunciations for many words of the same textual representation. For example, phonetic dictionary 22 has both T AH M EY T OW and T AH M AA T OW for the text, "tomato".

The embodiment of FIG. 2 further comprises a speech synthesis module 23. The speech synthesis module 23 accepts the text produced by speech engine 21. The speech synthesis module 23 uses a phonetic dictionary 24 to produce output speech audio. Phonetic dictionary 24 has a single phoneme sequence, representing a desired pronunciation, for each text word in the dictionary. Therefore, the audio produced by the speech synthesis module 23 corrects the user's usage of nominally incorrect pronunciations of words, and speaks it back to the user.

In some embodiments, phonetic dictionary 24 includes multiple entries with the same spelling in the case of heteronyms that have the same spelling but different pronunciations based on meanings, such as the word "desert", pronounced D EH Z ER T for a hot, dry, sandy region or pronounced D IH Z ER T for the act of abandoning others in a bad situation. Such multiple entries are tagged by their specific meanings, and the system uses an interpretation, according to a semantic grammar, to determine which meaning is appropriate for the speech synthesis. Some embodiments have multiple entries for text words that have the same meaning, but different pronunciations based on syntax, such as the word "the" which is pronounced DH AH when placed before a word that begins with a consonant and pronounced DH IY when placed before a word that begins with a vowel. FIG. 2 does not show the functions for choosing between different pronunciations of word text. However, whereas many words have multiple acceptable pronunciations, many do not require multiple pronunciations for speech synthesis to be correct. Phonetic dictionary 22 only has one entry for the word text "tomato".

Linguists often associate numbers of recognizable phonemes in each language: approximately 40 for English, approximately 40 for Mandarin Chinese, approximately 25 for Spanish, approximately 25 for Japanese, approximately 45 for German, approximately 25 for Korean, approximately 77 for Lithuanian. The set of phonemes actually used by any particular speaker of a language varies based on their dialect, accent, and native language.

Whereas a typical English phonetic dictionary has many, but a minority of words with multiple pronunciations, some embodiments use a hyperphonetic dictionary. A hyperphonetic dictionary recognizes more than the normal number of phonemes for a language, such as 100 or more. Such phonetic dictionaries are able to recognize multiple pronunciations for almost all words. Each pronunciation has a distance from a particular generally preferred pronunciation.

Figure 3:
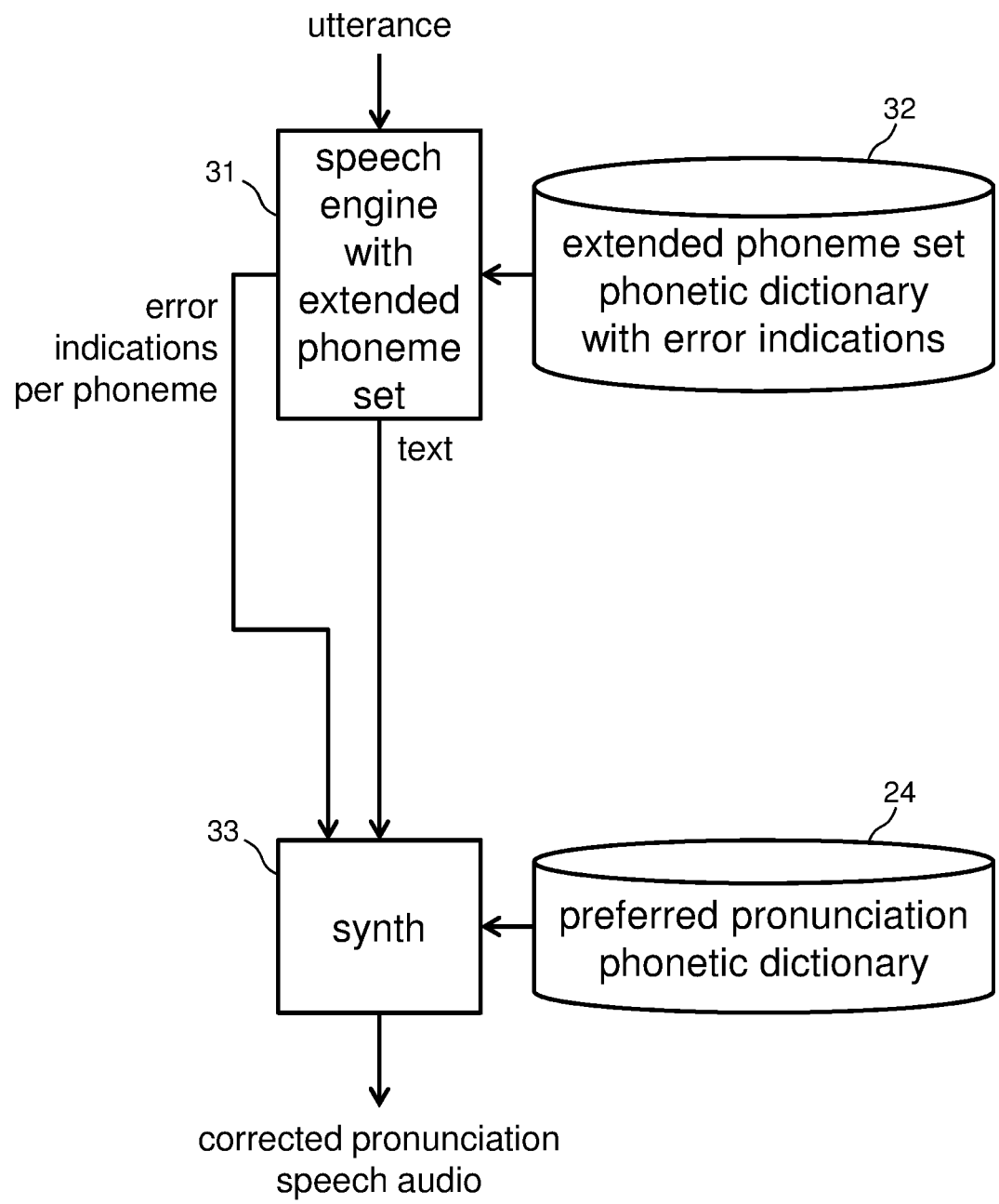
FIG. 3 illustrates a pronunciation training system, with a phonetic dictionary based on an extended phoneme set and error indications, according to an embodiment of the invention.

FIG. 3 shows an embodiment in which a speech engine 31 recognizes sequence hypotheses based on an extended phoneme set using a phonetic dictionary 32 based on an extended phoneme set with a value, for each phoneme sequence, of a degree of error difference from the preferred pronunciation of its word text. The system, according to an embodiment of the invention, generates an error indicator based on computer generated analysis. When speech engine 31 produces a text output, it also produces an indication of the error value associated with each phoneme in the text. Speech synthesis module 33 uses the text, and phonetic dictionary 24 with preferred pronunciations to produce speech audio with corrected pronunciation, which utilizes the error indicator information.

Some speech synthesis modules are able to produce speech with emphasis on particular words. Markup languages such as SSML are useful to represent degrees of emphasis for particular words for speech synthesis modules to produce. Some speech synthesis modules are able to synthesize speech with different degrees of stress on particular syllables. Syllables are units of organization for sequences of speech sounds, typically comprising a nucleus (most often a vowel) with optional initial and final margins (typically, consonants). In the embodiment of FIG. 3, the speech synthesis module 33 accepts the error value per phoneme that speech engine 31 produces. Speech synthesis module 33 uses it to apply stress to syllables based on the error value of the phoneme in the syllable with the greatest error value. As a result, the user hears speech audio with their utterance with corrected pronunciation, and emphasis to indicate what parts of the words they mispronounced.

Some embodiments apply emphasis, at per-word granularity, based on the average degree of mispronunciation of all of the phonemes in the word. Some embodiments synthesize speech with word emphasis or syllable stress only on the word of the utterance that had the highest error value.

Figure 4:
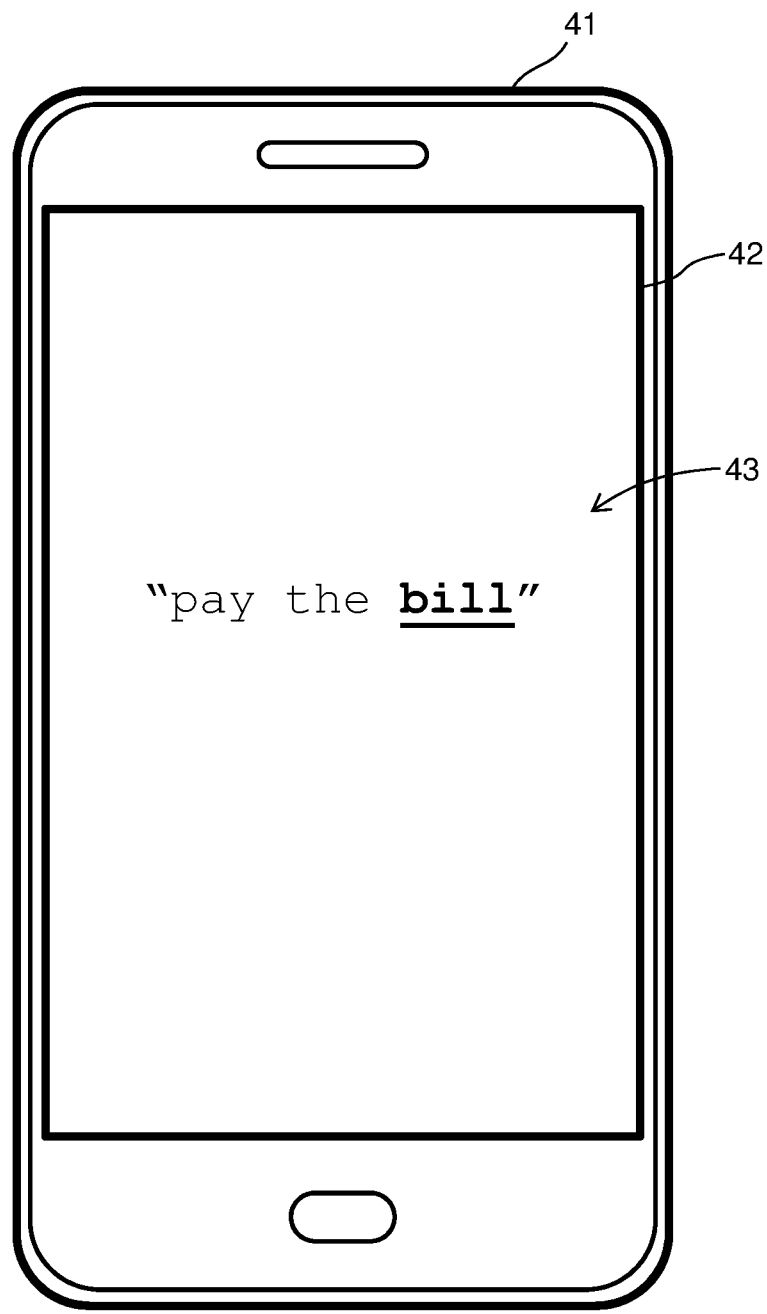
FIG. 4 illustrates a mobile device running training system software, according to an embodiment of the invention.

FIG. 4 shows an embodiment of the invention implemented using a mobile device 41. The mobile device 41 includes a display 42 and an antenna (or multiple antennae) in operable connection or communication with a transmitter and a receiver (not shown). In accordance with other aspects of the invention, the transmitter and the receiver may be part of a transceiver. The mobile device 41 may further include a controller, or other processing element, that provides signals to and receives audio signals from the transmitter and receiver, respectively. The signals include information in accordance with the air interface standard of the applicable cellular system, and also user speech, received data and/or user generated data. In this regard, the mobile device 41 is capable of operating with one or more air interface standards, communication protocols, modulation types, and access types.

The mobile device 41 runs an app that uses the display 42 to show a visual display of the text transcription 43 of each utterance. The embodiment of FIG. 4 displays the text such that the word with the greatest error value is highlighted by being shown in a bolder font than the rest of the text, and underlined. Various embodiments highlight words of interest by using a distinct font style, such as bold or italics, a distinct text or background color, a distinct brightness, capitalization of some or parts of the word, blinking, flashing, or other means of visually distinguishing the word of interest. FIG. 4 shows a scenario in which a user spoke P EY DH AH B IY L, speech engine 31 recognized the text "pay the bill", and indicated the word "bill" having a high error value. The app visually displays the utterance text transcription 43, and produces speech audio P EY DH AH B IH L.

In natural human speech, word emphasis can affect the implied meaning of an utterance. The phrase, "bought a car" with stress on the word "bought" would imply not receiving a car as a gift. With stress on the word "car" the phrase implies not buying a bicycle. Furthermore, other prosodic aspects of utterances, such as their speed, are meaningful to users. In order for users to hear the most similar speech output to their speech input, some embodiments detect emphasis, speed, pitch variation, and other prosody attributes and use those for speech synthesis to mimic user speech. Some embodiments repeat user speech, but change emphasis from the spoken speech to the most mispronounced word, but only if the pronunciation error value is above a threshold.

Some speakers are better able to identify their mispronunciations if they listen to a recording of their speech, rather than just hearing themselves as they speak. Some embodiments record the input spoken utterance and store the audio. At the end of utterance, the system first plays back the recorded audio, and then plays the synthesized speech with corrected pronunciation. Thereby, a user is able to aurally compare the utterance, as spoken, and the same utterance using preferred pronunciations.

FIG. 5A, FIG. 5B and FIG. 5C show an embodiment that is a wearable headset unit 51. It comprises an on/off switch 52. It comprises an internal battery, and a micro Universal Serial Bus (USB) battery charging port 53. It comprises an ear hook 54 that is able to hold the headset unit 51 attached to a human ear. The embodiment comprises an internal micro electro-mechanical system (MEMS) microphone that captures sound through a slot 55 and a speaker 56 that extends from the headset unit 51 into an ear's opening. A button 57 changes between three modes: a disabled mode that produces no synthesized speech audio; a parroting mode that produces speech audio at the end of every utterance; and a playback mode that plays the recorded user speech utterances and synthesized speech with corrected pronunciations. A button 58, when pressed, cycles through a variety of synthesized voices, including male and female voices and ones with different regional accents and pronunciations. Some embodiments include British and American English pronunciation voices. Each voice has an associated preferred pronunciation phonetic dictionary 24. The system switches phonetic dictionaries based on the voice setting.

Figure 6:
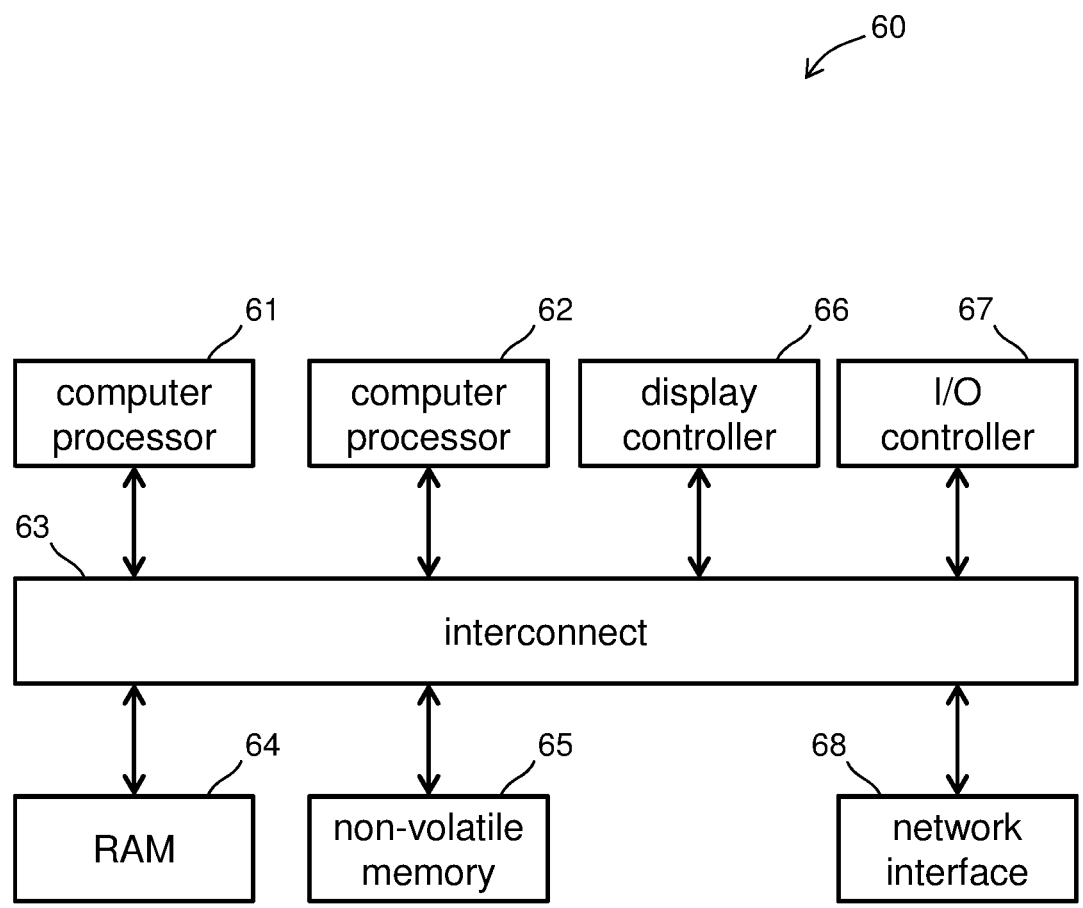
FIG. 6 illustrates a computer processing system, according to an embodiment of the invention.

Headset unit 51 is controlled by a system-on-chip (SoC). FIG. 6 shows a diagram of the SoC 60. In comprises two parallel computer processors 61 and 62. They connect through interconnect 63 to a random access memory (RAM)

64 and non-volatile Flash memory 65. The SoC 60 comprises a display controller module 66, which is useful for embodiments such as the mobile device of FIG. 4. SoC 60 also comprises I/O controller 67, which handles receiving button push input, microphone input, and speaker audio output. SoC 60 also comprises wireless network interface 68. This allows for updates to firmware, addition and deletion of voices, and updates to phonetic dictionaries.

Some embodiments are devices with microphones and low-power mobile processors optimized for audio digital signal processing (DSP) processing, such as with single-instruction multiple-data (SIMD) instruction set extensions. Some embodiments are cloud data center servers that receive digital audio samples over networks from remote microphone-enabled devices. Some such data center processors are massively parallel multi-core processors designed for load balancing the processing tasks for many simultaneous utterances. The power-performance profile and cost of general-purpose processors or even graphics processing units (GPUs) would be impractical for efficient data center operations when serving many simultaneous users.

Classifying Users

Figure 7:
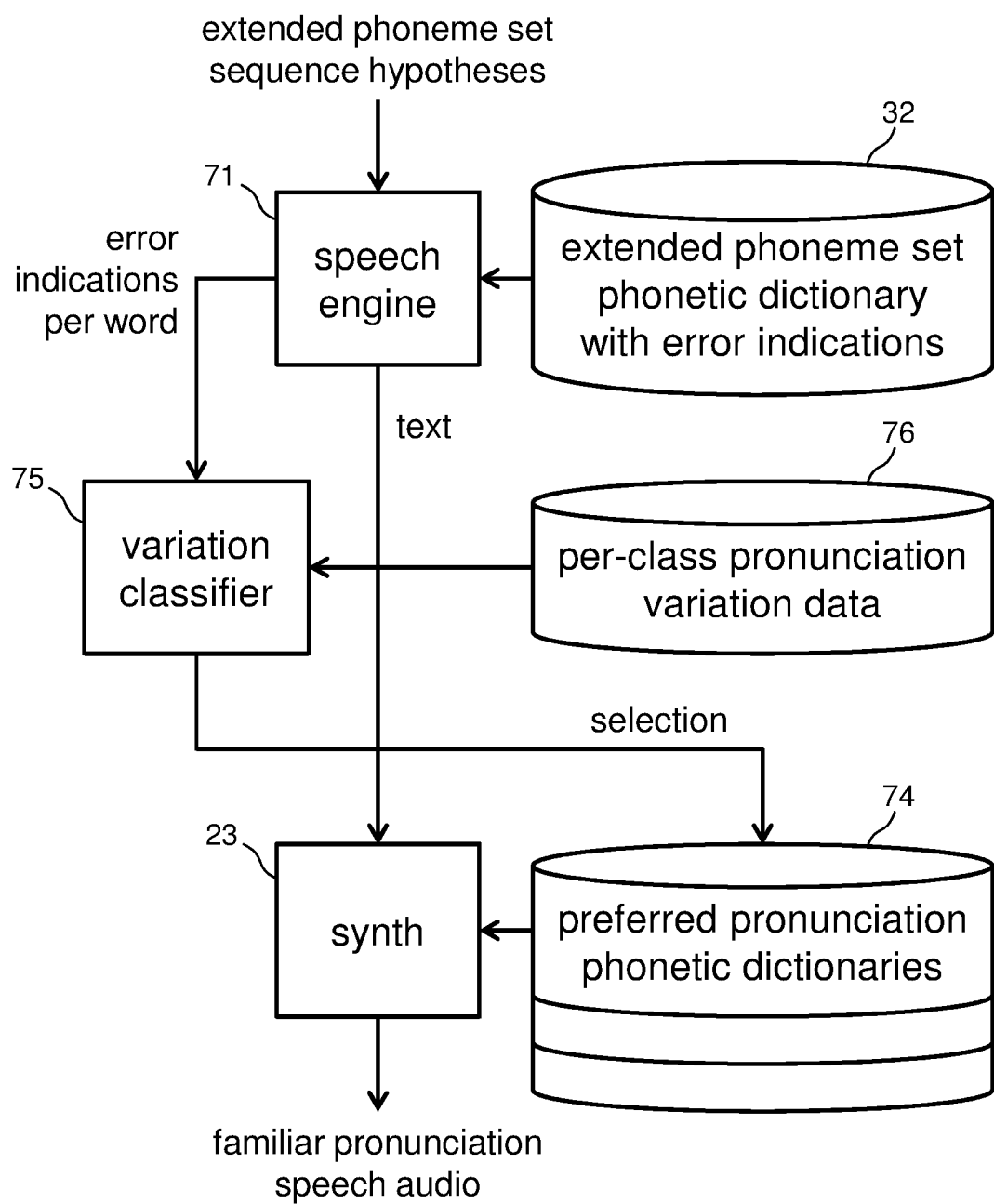
FIG. 7 illustrates a pronunciation training system, with user classification and preferred pronunciation selection, according to an embodiment of the invention.

Some system users, based on their region or dialect, prefer to hear synthesized speech using localized pronunciations. FIG. 7 shows such an embodiment. It has a set of phonetic dictionaries 74 with preferred pronunciations, one for each dialect. The embodiment has a speech engine 71 that receives extended phoneme set sequence hypotheses, applies an extended phoneme set phonetic dictionary with error indications 32, and produces transcription text and a set of error indications per word. The system comprises a variation classifier 75. The variation classifier accepts the per word error indications, compares them to per-class pronunciation variation data in database 76, and classifies the utterance by identifying which pronunciation variations were in the utterance.

Variation classifier 75 stores its detected class, and outputs it as a selection signal to the set of preferred pronunciation phonetic dictionaries 74. Speech synthesis unit 23 uses the selected preferred pronunciation phonetic dictionary 74 to produce synthesized speech audio using familiar pronunciations.

Variation classifier 75 continuously performs classification, and compares its identified class to its stored class. If the identified class does not match the stored class for several utterances in a row, the variation classifier 75 changes its stored class to the identified class, and outputs the new class as the selection signal.

In some embodiments, the per-class pronunciation variation data 76 includes a large portion of words in the phonetic dictionaries. In some embodiments, the per-class pronunciation variation data only includes a small number of frequently spoken words that are very distinct between dialect classes. For example, the word, "lawyer" is pronounced L OY ER in northeastern and western US, but pronounced L AO Y ER in the southern US.

Figure 18:
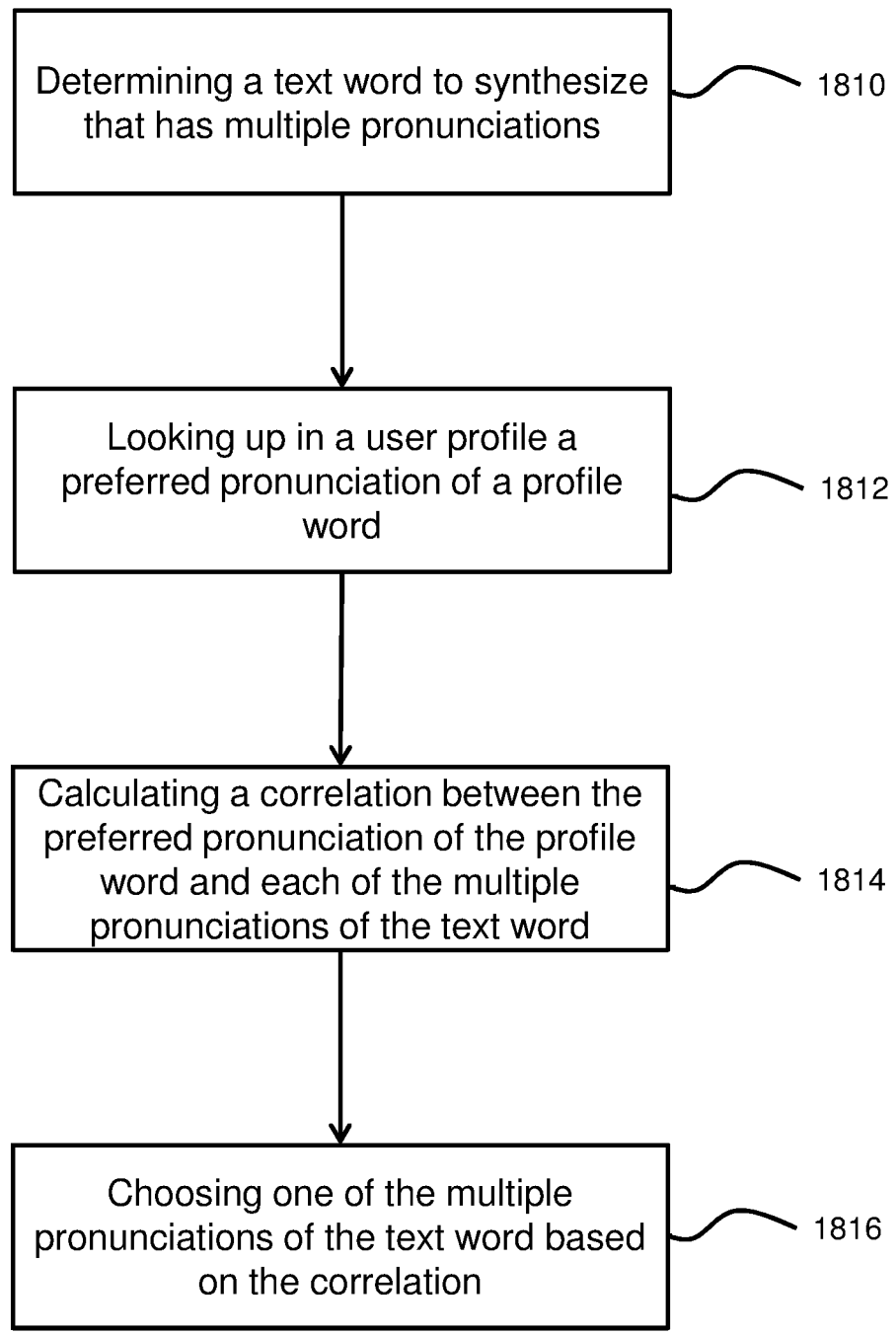
FIG. 18 illustrates a process to determine a pronunciation for a text word with multiple known pronunciations, according to an embodiment of the invention.

Referring to FIG. 18 and FIG. 8, FIG. 8 shows samples of words from dialect-specific phonetic dictionaries. Dictionary sample 81 is for standard American English. It includes two acceptable pronunciations of the word "aunt". Dictionary sample 82 is for Indian English. It includes two common pronunciations of the word "wine". Since many Indian languages do not have a W phoneme, many Indian English speakers substitute a V phoneme, though the W pronunciation is preferred. Dictionary sample 83 is for Chinese English. It includes two common pronunciations of the word "bill". Since many Chinese languages do not have an IH phoneme, many Chinese English speakers substitute an IY phoneme, though the IH phoneme is preferred.

The dictionary samples of FIG. 8, for words having multiple recognizable pronunciations, list each with a colon followed by a number. The listing includes the preferred pronunciation first, and numbered zero.

Some embodiments use a single preferred pronunciation phonetic dictionary, but have multiple entries for words with varying dialect-specific pronunciations. Such embodiments choose between the pronunciations based on the selection signal. Some embodiments have a single phonetic dictionary for the speech engine and the speech synthesis module. The phonetic dictionary includes multiple pronunciations, but indicates one as preferred, such as by placing it first on a list of pronunciations. Some embodiments with a single phonetic dictionary support dialect-specific pronunciations by tagging separate specific preferred pronunciations based on each class, as indicated by a class selection signal.

Certain classes of speakers tend to have corresponding accents. Some embodiments include a speech engine that uses acoustic models, such that the acoustic model can be selected. Various acoustic models are trained on speech with different accents. The selection signal from a variation classifier drives both the selection of a preferred pronunciation phonetic dictionary and selection of an acoustic model for the speech recognition front end. Some systems apply adaptation algorithms to baseline acoustic models.

User Preferences

Some embodiments customize speech synthesis based on what pronunciations a user tends to speak. Some embodiments mimic the user's pronunciation. Some embodiments adjust pronunciations in other ways that do not always mimic, but sometimes mimic and sometimes guide and teach the user by choosing different pronunciations. For example, a system mimics the user's preference for pronunciations when both are widely accepted, but uses the more common pronunciation when it is significantly more common than an alternative. Accordingly, such a system mimics a user's choice of T AH M EY T OW or T AH M AA T OW, but pronounces the acronym "NASA" as N AE S AH, even if the user tends to use the rare pronunciation, N EY S AH.

Referring now to FIG. 17, FIG. 19, FIG. 20 and FIG. 9, FIG. 9 shows an embodiment that customizes speech synthesis based on what pronunciations a user tends to speak. It comprises a speech engine 91 that receives phoneme sequence hypotheses. It produces hypothesized transcription words, which, in some configurations go to a semantic parser 93. The semantic parser checks word hypotheses for likely grammatical correctness, and returns a score to the speech engine 91. The speech engine 91 uses the scores to more accurately select and produce as output the most likely text. Furthermore, since a semantic parse identifies the specific meanings of words, the semantic parser 93 identifies which of multiple meanings of a given spelling of the word the user probably spoke. For example, the word text "bass" is pronounced B AE S if it refers to a fish, and B EY S if it refers to music. For example, the word text "produce" is pronounced with stress on the first syllable if it is the noun meaning fruits and vegetables, but with stress on the second syllable if it is the verb meaning to create. A phonetic dictionary 92 indicates different specific phoneme sequences and different stress patterns for different meanings of the same word text.

In embodiments without semantic parsing, speech engine 91 produces transcription text output. In embodiments with semantic parsing, speech engine 91 produces representations of the meaning of utterances. A handler 94 processes the transcription or meaning and performs a desirable system function. In virtual assistant systems, the handler 94 looks up answers to questions. In autonomous vehicles, the handler 94 drives the vehicle to specified locations. In communication devices, the handler 94 sends messages. The handler 94 eventually produces response text. In some embodiments, it is a plain text string. In some embodiments, it has pronunciation indications, such as stress, and in some embodiments, it includes meaning indications useful for looking up particular ones of multiple entries of word text in the phonetic dictionary.

A list manager 95 receives the transcription text or meaning representation from speech engine 91, as well as a pronunciation indicator. For example, for the word "aunt", the speech engine 91 either produces the text aunt:0 or aunt:1 depending on which pronunciation the user spoke. List manager 95, monitors words flowing from the speech engine 91 to the handler 94. For each word that has more than one recognized pronunciation, the list manager 95 looks into a word list 96 within a user profile 97. If the word is in the word list 96, then the list manager 95 updates the preferred pronunciation to whichever pronunciation was spoken. If the word is not in the word list 96, then the list manager 95 adds the word to the list with the indication of the pronunciation that the user spoke.

User profile 97 is specific to whichever known system that the user is logged in and authenticated. In some embodiments, user profiles are tied to device IDs. In some embodiments, user profiles are shared among groups of users. In some embodiments, user profiles comprise information other than word lists, such as an indication of a preferred speech synthesis voice, speech speed, location, and credit card number, among other information.

Pronunciation selector 98 receives response text from handler 94. In many embodiments, the response text is different from the spoken user text. However, it is normal that, after a user uses the system for a significant number of utterances, some responses will use words that the user spoke. For example, if a user asks, "What's the weather in Bangor, Maine", the system might respond, "Cold and rainy", but if the user asks, one week later, "What's the nearest shopping center", the system might respond, "The Bangor Mall", using the same pronunciation of Bangor that the user spoke in the first utterance.

The pronunciation selector 98 provides this behavior by, when receiving response text, searching the word list 96 for each word in the response text. For each response text word found in the word list 96, the pronunciation selector 98 selects, from the phonetic dictionary 92, the stored preferred pronunciation. For each response text word not found in the word list 96, the pronunciation selector 98 selects the generally preferred (most common, and first-listed) pronunciation of each word from the phonetic dictionary 92.

The pronunciation selector sends the response phoneme sequence to speech synthesis module 99, which produces speech audio. In system variations that produce meanings, rather than just response text from the handler 94, the pronunciation selector 98 passes the stress indicators specific to the response word meaning to the speech synthesis module 99.

Figure 9:
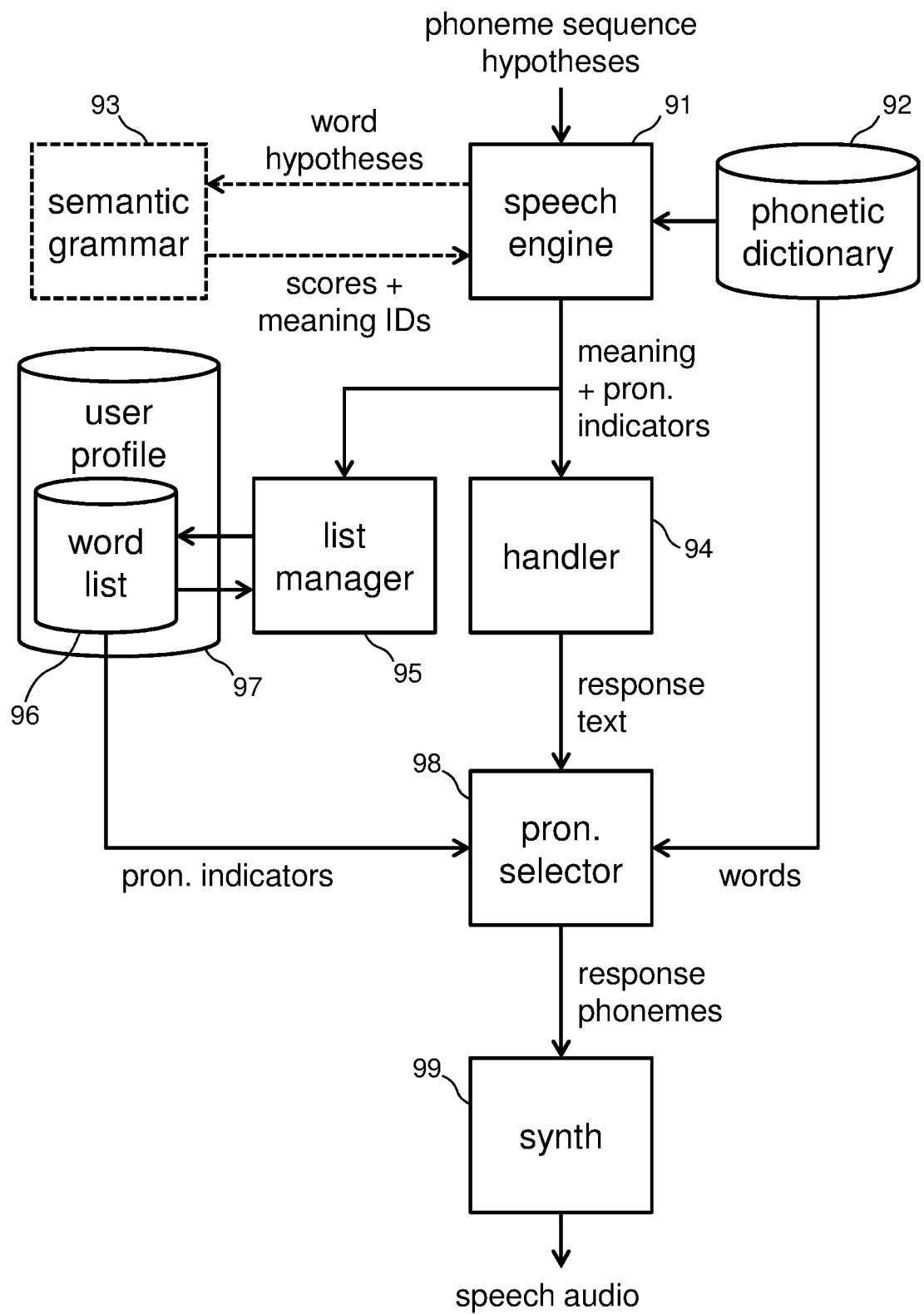
FIG. 9 illustrates a request-handling system that stores user-specific preferred pronunciations, according to an embodiment of the invention.

Referring to FIG. 9 and FIG. 10, FIG. 10 illustrates a scenario of user interaction with a smug robot according to an embodiment. Some phonetic dictionary entries 101 are shown. Words with multiple pronunciations are indicated by a ":" followed by a unique identification for each pronunciation. A user speaks a sentence using the words from the phonetic dictionary. A speech engine 91 transcribes the utterance into text 102. The list manager 95 identifies that the words "aunt" and "tomatoes" each have multiple recognized pronunciations, and stores in user profile word list 103 the user's preferred pronunciation of each one. The system handles the utterance in the handler 94, and produces response text 104. The pronunciation selector 98 looks up pronunciations in a phonetic dictionary 92, and chooses a pronunciation, for each word in the response text 105. The pronunciation selector 98 uses the most common pronunciation for each word (the ":0" one), except for the word "aunt". That is because the pronunciation selector 98 searched the user profile word list 103 and identified that the user prefers pronunciation ":1" for the word "aunt." Therefore, the pronunciation selector 98 chooses the ":1" pronunciation of the word "aunt" from the phonetic dictionary 92, and provides the phoneme sequence for that pronunciation in the response phonemes 105 that it sends to speech synthesis module 99.

Using Correlations

Most Americans pronounce the word, "park" as P AA R K and "corn" as K AO R N, but people native to Boston commonly pronounce them P AA K and K AO N. Some embodiments use user profile information to select dialect-specific phonetic dictionaries for speech synthesis. Some embodiments, upon identifying one or more word pronunciations that distinctly indicate a particular dialect or set of possible dialects, change the phonetic dictionary, or adjust the preference order of pronunciations in a phonetic dictionary, thereby adopting full dictionaries of dialectic pronunciations likely preferred by the user.

Certain groups of people have sets of pronunciations. For example, most people in the US pronounce the word, "been", as B IH N, but people in the Upper Midwest are more likely to pronounce the word as B EH N. Most people in the US pronounce the word "roof" as R UW F, but people in the Upper Midwest are more likely to pronounce the word as R UH F. There is a distinct positive correlation between the pronunciations B EH N and R UH F.

Some embodiments use known pronunciation correlations, such as these, to adapt a phonetic dictionary. This is a more fine-grained approach that uses specific correlations that do not identify distinct dialects. Linguists study such correlations, and their strengths. Such embodiments use correlation rules defined by linguistic analysis.

Some embodiments identify correlations between pronunciations, across users, and train their own phonetic dictionary adaptation rules. By performing a multiple correlation between each word pronunciation and all other word pronunciations, a system can most accurately choose an individual user's preferred pronunciation based on their personal word list. In practice, a real-time multiple correlation based on all words in the user's word list would require more processing time and power than is worthwhile for the user experience benefit. Therefore, some embodiments choose certain benchmark words that are both common, and widely distinguishing of different user pronunciation preferences. For example, the word "is" can be a good benchmark word because it is frequently used, and because it uses the IH phoneme. English uses the IH phoneme a lot, but many other languages do not. Non-native English speakers tend to replace IH with IY. Therefore, a system that detects "is"

pronounced as IY Z will easily find strong correlations to pronunciations of words that use IY in place of IH.

Figure 11:
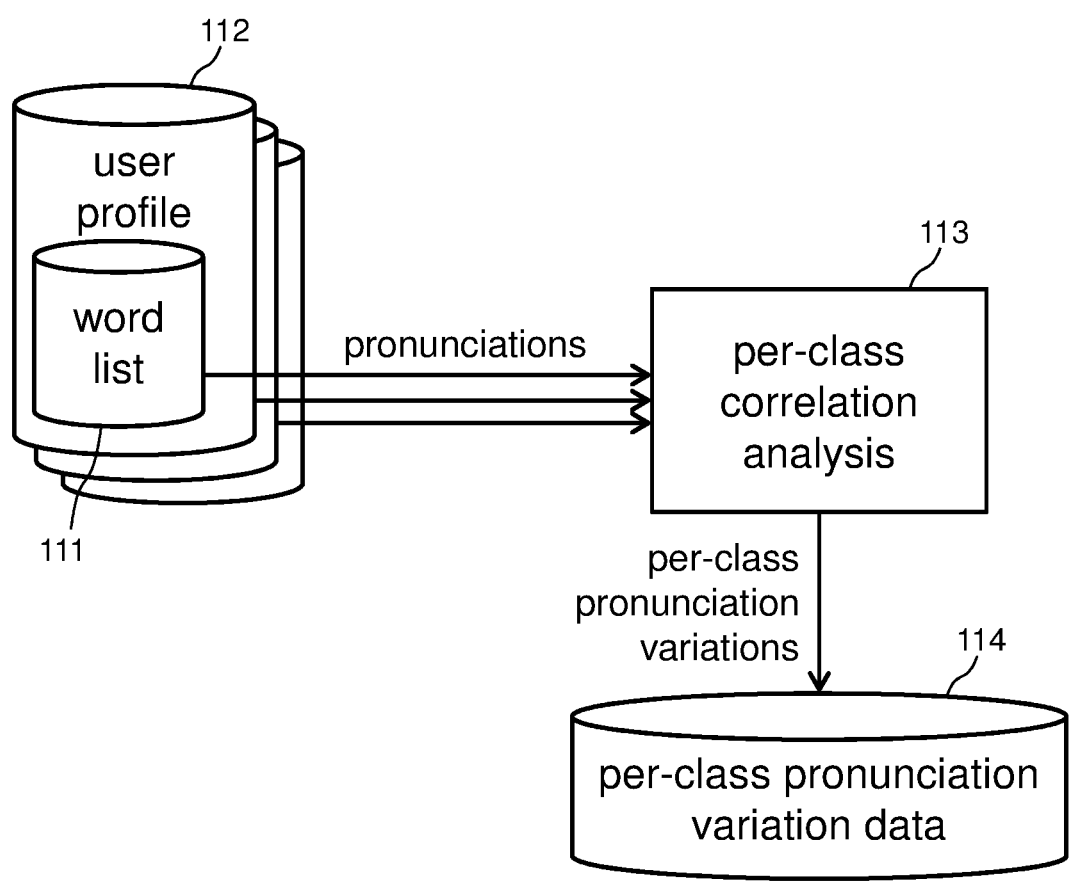
FIG. 11 illustrates training a preferred pronunciation dictionary for a particular user class, according to an embodiment of the invention.

Various embodiments apply pronunciation variation data as an overlay, or filter on pronunciations from a global phonetic dictionary. FIG. 11 shows an embodiment that analyzes pronunciations from word lists 111 across multiple user profiles 112 within particular classes of users. For example, one application would be to analyze user profiles of users known to connect using internet protocol (IP) addresses in India. One application would be to analyze user profiles that contain at least five Chinese characters. The embodiment of FIG. 11 performs a per-class correlation analysis 113 on the selected class of user profiles. The per-class correlation analysis 113 produces per-class pronunciation variation data 114. The per-class pronunciation variation data 114 is useful for adapting the choice of pronunciations from phonetic dictionaries. It is particularly useful when phonetic dictionaries indicate not just an order of preference of different pronunciations of words, but also weights for each pronunciation. Accordingly, some embodiments apply, for users who fit multiple classes, multiple per-class pronunciation variation filters to the global phonetic dictionary in order to score and choose the most likely preferred pronunciation for the user.

Figure 12:
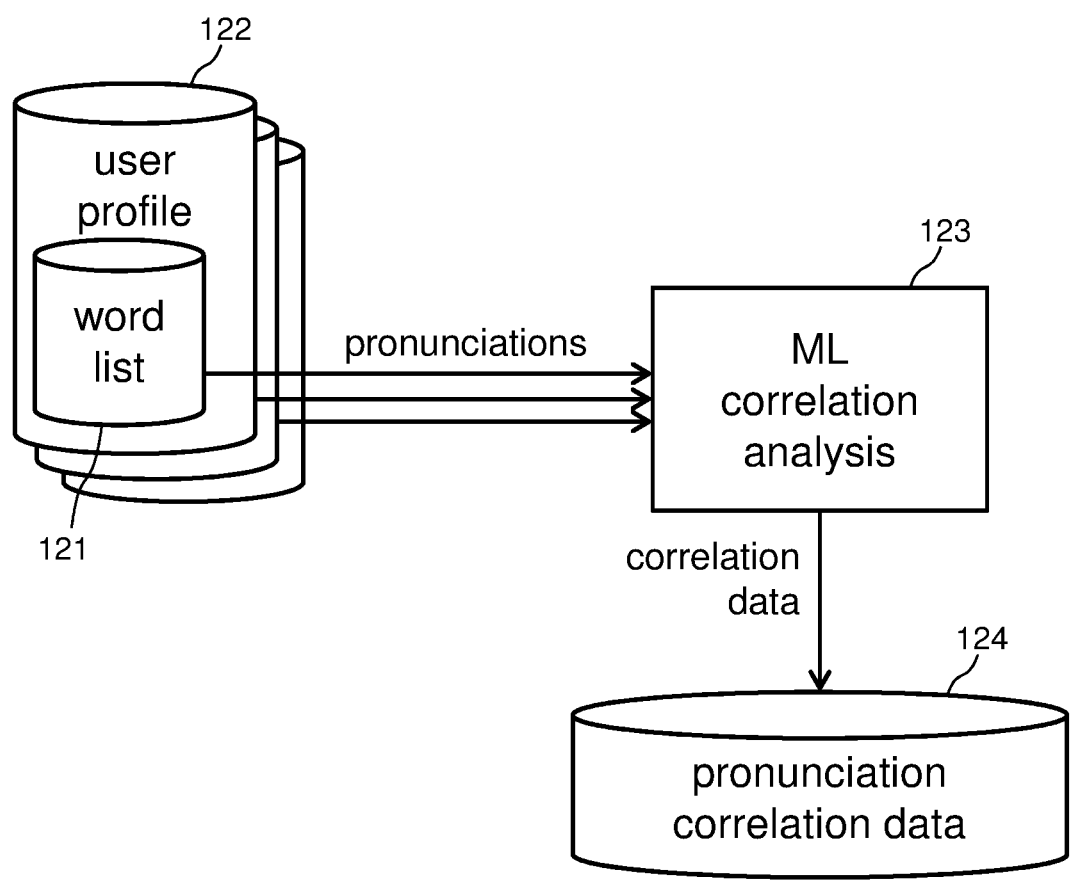
FIG. 12 illustrates determining preferred pronunciation using machine learning based on correlations of preferred pronunciations between users, according to an embodiment of the invention.

FIG. 12 shows an embodiment that analyzes word lists 121 across many user profiles 122, without regard to profile classification. The embodiment performs a multiple correlation analysis 123 using a machine learning (ML) algorithm. Many appropriate open source and proprietary ML tools, software, frameworks, and APIs are available, such as Apache Spark's MLlib, TensorFlow, Torch, Theano, and ones from Amazon Web Services. Some embodiments use custom-built algorithms. The embodiment of FIG. 12 produces pronunciation correlation data 124. This is useful for user-specific, in some cases real-time, selection of likely preferred pronunciations based on the benchmark words with pronunciations identified in the user's profile.

FIG. 13 shows a scenario of the use of pronunciation correlation data. Pronunciation correlation data 131 indicates that, for each of the two acceptable pronunciations of the benchmark word "aunt", AE N T and AO N T, there are identified correlations to a preferred choice of pronunciation of the word "tomatoes". Specifically, users who use the pronunciation AE N T use the pronunciation T AH M EY T OW Z with a probability of 0.8 and the pronunciation T AH M AA T OW Z with a probability 0.2. Users who use the pronunciation AO N T use the pronunciation T AH M EY T OW Z with a probability of 0.45 and the pronunciation T AH M AA T OW Z with a probability 0.55. For a user with the AO N T pronunciation of "aunt" (identified by the ":1") in the user word list 132, when the system synthesizes speech for response text "tomatoes" 133, it will choose the pronunciation T AH M AA T OW Z.

Crowdsourcing Phonetic Dictionaries

Some embodiments crowdsource the order or weights of the different pronunciations of words that have multiple pronunciations. In some embodiments, speech engines recognize each of the pronunciations, and output the word in the transcription and an indication of which pronunciation was recognized. The embodiment accumulates counts of each pronunciation, and sorts or scores the pronunciation entries in the phonetic dictionary based on the counts for each pronunciation. This favors the pronunciations preferred by users who use a word frequently. Some embodiments count the preferred pronunciation across all users' profile word lists. This avoids bias towards most common speakers, but gives disproportionate influence to users over words that they only rarely use.

Crowdsourcing is particularly useful when new words enter the dictionary. Occasionally new words come into a language. For example, recently the word "fam" meaning family, the word "Google" meaning to conduct a web search, and the acronym TSA for the transportation security administration, and the name Quvenzhané Wallis of a child actress entered common English use.

In recent years, the acronym GABA, for gamma-Aminobutyric acid, has come into common use. Some people pronounce its letters, JH IY EY B IY EY. Some people pronounce it as a word G AE B AH or G AA B AH. Some embodiments update the dictionary with the text GABA, and all three pronunciations. Then, after recognizing the word a significant number of times in speech input, the system learns the frequency of each pronunciation. As a result, the system produces the preferred pronunciation in its speech synthesis of the word.

Crowdsourcing pronunciations is useful when new proper nouns come into the language, but also reinforces incorrect pronunciations if they are common. Some embodiments allow manual overrides of pronunciations to avoid having the system training users to use the common mispronunciations of difficult incoming proper nouns such as Quvenzhané.

ASR Accuracy

Some embodiments use personal lists of word pronunciation preferences to improve ASR by improving the performance of the speech engine. Sometimes a speech engine receives two strongest phoneme sequence hypotheses with similar weights. This occurs such as when there is a lot of background noise or microphone distortion. Consider the word "data", which has two common pronunciations, D AE T AH and D EY T AH. Consider the similar phoneme sequences D AE T AH V EH N D AO R (as in the phrase "data vendor") and DH AE T AH V AH N D AO R (as in the phrase "that oven door"). Consider a scenario of a speech engine receiving those as the mostly highly scored phoneme hypotheses, but the first having a slightly higher score. Absent any other helpful input, such as semantic parsing according to grammar rules or considering context, the speech engine would naturally favor the transcription, "data vendor".

However, some embodiments consult the user's profile word list. For hypothesis words that have multiple pronunciations, the system provides a favorable weight to the user's preferred pronunciation or an unfavorable weight to pronunciations that the user does not favor. If the user's preferred pronunciation is D EY T AH, not D AE T AH, then the speech engine scales down the score of the first hypothesis, and the speech engine will therefore choose the transcription, "that oven door".

Figure 14:
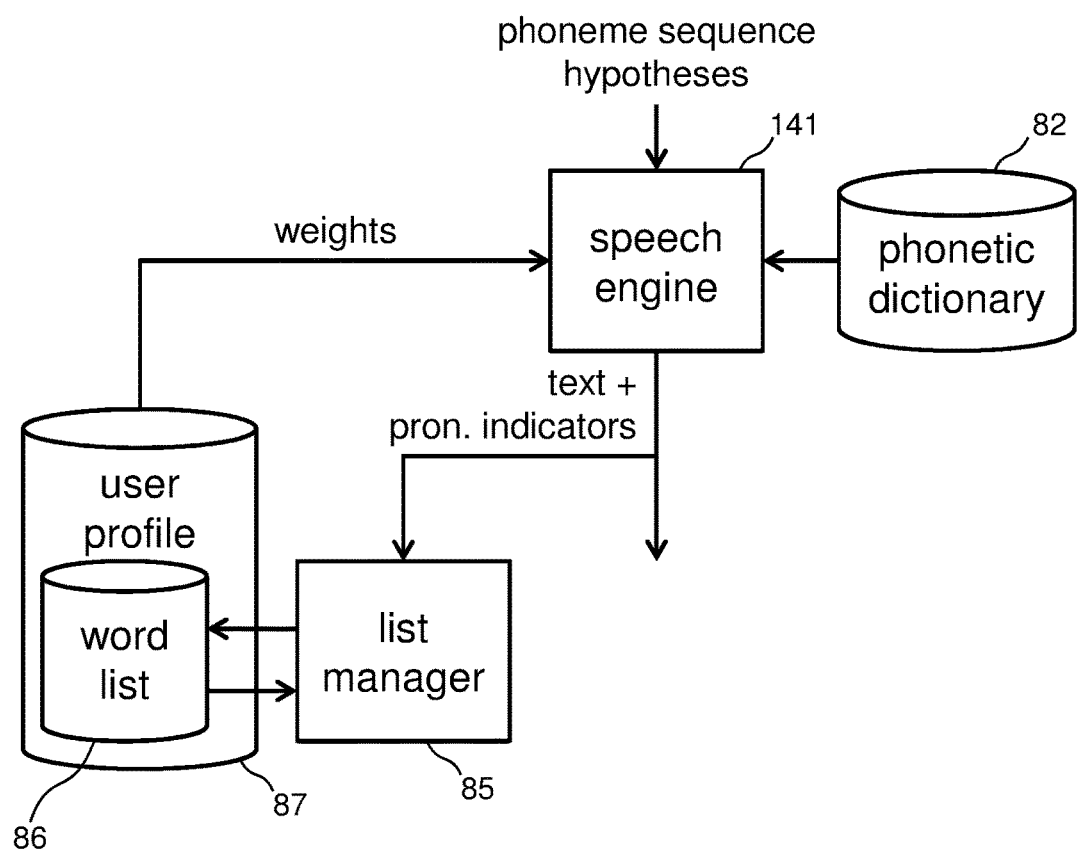
FIG. 14 illustrates a speech recognition system using a user profile to indicate preferred pronunciations of words from a phonetic dictionary, according to an embodiment of the invention.
Figure 19:
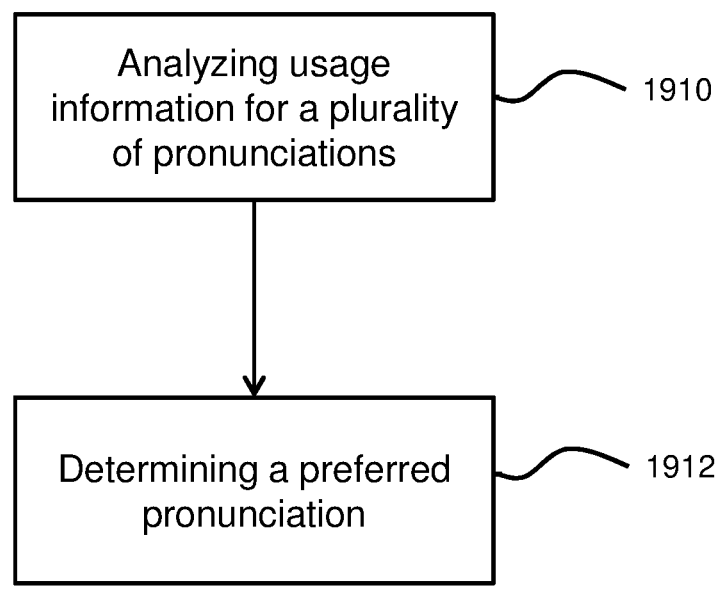
FIG. 19 illustrates a process to determine a preferred pronunciation based on usage information, according to an embodiment of the invention.

Referring to FIG. 19 and FIG. 14, FIG. 14 shows an embodiment. A speech engine 141 receives phoneme hypotheses. It recognizes speech according to pronunciations in a phonetic dictionary 82. The speech engine 141 produces output transcription text as well as indicators of which pronunciation it recognized for words with multiple pronunciations. A list manager 85 uses the pronunciation indicators to maintain a word list 86 within a user profile 87. The speech engine 141 takes in the user pronunciation data from the word list as weights to scale the scores of phoneme, and resulting transcription hypotheses. By doing so, the speech engine 141 is able to better recognize poor quality speech input and thereby produce correct transcriptions with greater frequency.

Figure 15:
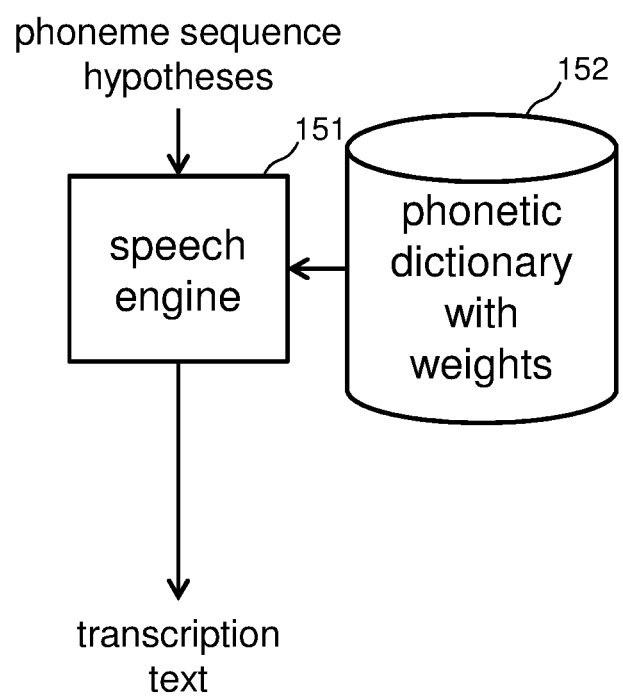
FIG. 15 illustrates a speech recognition system using a phonetic dictionary that includes indications of preferred pronunciations, according to an embodiment of the invention.
Figure 17:
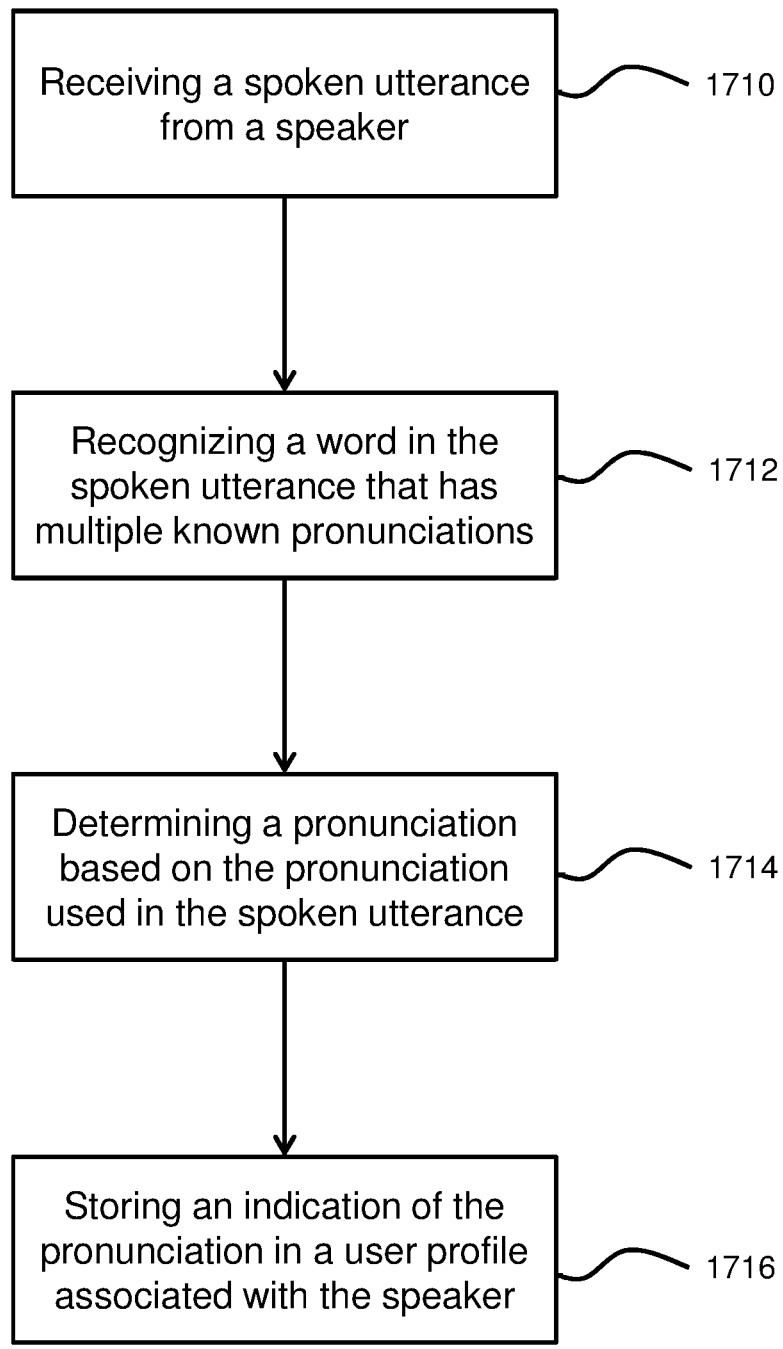
FIG. 17 illustrates a process to determine a pronunciation for a spoken utterance with multiple known pronunciations, according to an embodiment of the invention.

FIG. 15 shows an embodiment in which a speech engine 151 performs recognition of phoneme sequence hypotheses using a phonetic dictionary with weights 152. In various embodiments, the phonetic dictionary weights are trained in various ways, such as crowdsourcing or linguistic analysis. The speech engine 151 scores each transcription hypothesis based on the weights associated with each of the pronunciations hypothesized for words with multiple pronunciations. By doing so, the speech engine 151 is better able to recognize poor quality speech input and thereby produce correct transcriptions with greater frequency.

The embodiment of FIG. 14 is most beneficial as the system improves for any given user. The embodiment of FIG. 15 is most beneficial for new users who do not yet have a history. It is possible to weight hypothesis scores using both the techniques of FIG. 14 and FIG. 15. Furthermore, if the system can classify a new user, it can choose between different phonetic dictionaries with weights, or adapt a global phonetic dictionary's weights based on the class of the user.

Numerous algorithms are appropriate for calculating weighted scores. One possible algorithm is to:

Select a phonetic dictionary based on a user class;

Associate the phonetic dictionary weights with each word in each transcription hypothesis for words that have multiple pronunciations;

Replace the weights from the phonetic dictionary with a large constant (e.g. 0.8) if the hypothesized pronunciation is the preferred one from the user profile word list, or a small constant (e.g. 0.25) if the hypothesized pronunciation is not the preferred one;

Compute a hypothesis score based on the average weight associated with each word that has multiple pronunciations, but counting the word weight once for each phoneme that varies from the phonemes of the preferred pronunciation.

Referring again to FIG. 17, a flow process is shown in accordance with the invention, where a spoken utterance is received at 1710. The system, that is executing the process, at step 1712 recognizes that a word in the spoken utterance includes multiple known pronunciations. At step 1714, the system determines a pronunciation based on the pronunciation used in the spoken utterance. At step 1716, an indicator is stored in the user's profile that provided the spoken utterance for the pronunciation.

Referring now to FIG. 18, a flow process is shown in accordance with the invention, where the system determines at step 1810 that a text word for synthesis has multiple pronunciations. At step 1812, a preferred pronunciation is looked up in the user profile for a profile word. At step 1814, the system calculates a correlation between the preferred pronunciation of the profile word and the various pronunciations of the text word. At step 1816, the system is choosing one of the various pronunciations of the text word based on the correlation.

Referring now to FIG. 19, a flow process is shown in accordance with the invention, where the system, at step 1910 analyzes usage information for various pronunciations and, at step 1912, determines a preferred pronunciation.

Figure 20:
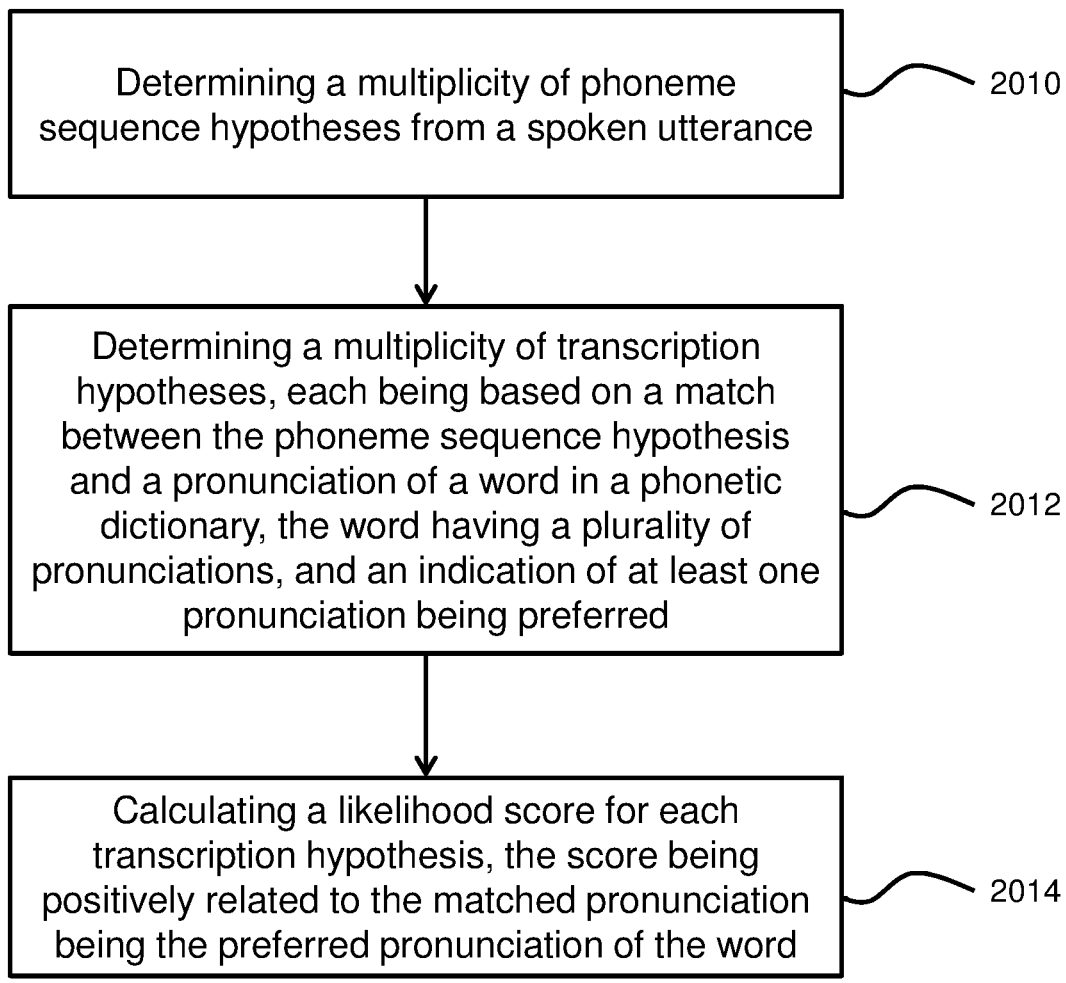
FIG. 20 illustrates a process for determining a score that is a positive correlation between a preferred pronunciation and a matched pronunciation, according to an embodiment of the invention.

Referring now to FIG. 20, a flow process is shown in accordance with the invention, where the system, at step 2010, determines a multiplicity of phoneme sequence hypotheses from a spoken utterance. At step 2012, the system determines a multiplicity of transcription hypotheses. Each hypotheses is based on a match between the phoneme sequence hypothesis and a pronunciation of a word in a phonetic dictionary. The system recognizes when a word has a plurality of pronunciations and has information regarding an indication of at least one pronunciation being a preferred pronunciation. At step 2014, the system calculates a likelihood score for each transcription hypothesis, the score being positively correlated to the matched pronunciation being the preferred pronunciation of the word.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

Embodiments of the invention described herein are merely exemplary, and should not be construed as limiting of the scope or spirit of the invention as it could be appreciated by those of ordinary skill in the art. The disclosed invention is effectively made or used in any embodiment that comprises any novel aspect described herein. All statements herein reciting principles, aspects, and embodiments of the invention are intended to encompass both structural and functional equivalents thereof. It is intended that such equivalents include both currently known equivalents and equivalents developed in the future.

The behavior of either or a combination of humans and machines (instructions that, when executed by one or more computers, would cause the one or more computers to perform methods according to the invention described and claimed and one or more non-transitory computer readable media arranged to store such instructions) embody methods described and claimed herein. Each of more than one non-transitory computer readable medium needed to practice the invention described and claimed herein alone embodies the invention.

Some embodiments of physical machines described and claimed herein are programmable in numerous variables, combinations of which provide essentially an infinite variety of operating behaviors. Some embodiments of hardware description language representations described and claimed herein are configured by software tools that provide numerous parameters, combinations of which provide for essentially an infinite variety of physical machine embodiments of the invention described and claimed. Methods of using such software tools to configure hardware description language representations embody the invention described and claimed. Physical machines, such as semiconductor chips; hardware description language representations of the logical or functional behavior of machines according to the invention described and claimed; and one or more non-transitory computer readable media arranged to store such hardware description language representations all can embody machines described and claimed herein.

In accordance with the teachings of the invention, a computer and a computing device are articles of manufacture. Other examples of an article of manufacture include: an electronic component residing on a motherboard, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

The article of manufacture (e.g., computer or computing device) includes a non-transitory computer readable medium or storage that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computing device. The processor or a module, in turn, executes the computer readable program code to create or amend an existing computer-aided design using a tool. The term "module" as used herein may refer to one or more circuits, components, registers, processors, software subroutines, or any combination thereof. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Furthermore, to the extent that the terms "including", "includes", "having", "has", "with", or variants thereof are used in either the detailed description and the claims, such terms are intended to be inclusive in a similar manner to the term "comprising".

The scope of the invention, therefore, is not intended to be limited to the exemplary embodiments shown and described herein. Rather, the scope and spirit of present invention is embodied by the appended claims.

What is claimed is:

1. At least one non-transitory computer readable medium storing computer code that, if executed by at least one computer processor within a pronunciation training system, would cause the at least one computer processor to:
   receive a spoken utterance from a speaker;
   detect an end of the spoken utterance;
   perform automatic speech recognition on the spoken utterance to produce a transcription of the words in the spoken utterance;
   perform speech synthesis from the transcription to produce synthesized speech according to a phonetic dictionary having mappings to single phoneme sequences representing standard pronunciation; and
   responsive to detecting the end of the spoken utterance, output the synthesized speech,
   wherein the system, in response to detecting the end of the spoken utterance, provides a user with an audible output of the transcription, spoken with the standard pronunciation.

2. The at least one non-transitory computer readable medium of claim 1 wherein the at least one computer processor would further be caused to compute error values, each error value indicates a degree of pronunciation error in a corresponding word in the spoken utterance.

3. The at least one non-transitory computer readable medium of claim 2 wherein the at least one computer processor would further be caused to use the error values to determine a level of emphasis for the corresponding word in speech synthesis.

4. The at least one non-transitory computer readable medium of claim 2 wherein the at least one computer processor would further be caused to:
   cause a visual display to show the transcription as text; and
   highlight the text of one or more words in the transcription in response to each error value in the corresponding word.

5. The at least one non-transitory computer readable medium of claim 1 wherein the at least one computer processor would further be caused to:
   compute error values that each indicate a pronunciation error in a corresponding syllable in the spoken utterance; and
   use the error value for each syllable to determine a level of stress for the corresponding syllable in the speech synthesis.

6. The at least one non-transitory computer readable medium of claim 1 wherein the at least one computer processor would further be caused to:
   determine a prosody attribute from the spoken utterance; and
   adapt the speech synthesis according to the prosody attribute.

7. The at least one non-transitory computer readable medium of claim 6 wherein the prosody attribute is an emphasis.

8. The at least one non-transitory computer readable medium of claim 6 wherein the prosody attribute is a speech rate.

9. The at least one non-transitory computer readable medium of claim 1 wherein the at least one computer processor would further be caused to:
   create a recording of the spoken utterance; and
   output the recording, wherein the user can aurally compare the recording and the synthesized speech.

10. A method of determining which of a plurality of pronunciations of a word in a digital phonetic dictionary to use in speech synthesis, the method comprising:
receiving a spoken utterance from a speaker;
recognizing from the spoken utterance, using a speech engine, a word that has multiple known pronunciations;
selecting a preferred pronunciation from the multiple known pronunciations of the word that matches the speaker's pronunciation of the word used in the spoken utterance; and
storing, in a user profile associated with the speaker, an indication of the preferred pronunciation that the speaker used,
wherein the speech engine uses the stored preferred pronunciation to select between multiple known pronunciations of the word when synthesizing the speaker's future spoken utterances that includes the word.

11. The method of claim 10 further comprising choosing for a spoken word, based on the indication, to output, one of multiple known pronunciations of the spoken word.

12. The method of claim 10 further comprising classifying the speaker based on the determination of the pronunciation of the multiple known pronunciations of the spoken word the speaker used in the spoken utterance.

13. The method of claim 12 further comprising choosing for the spoken word, based on the classification, to output one of multiple known pronunciations of the spoken word.

14. The method of claim 12 further comprising using the classification to filter a phonetic dictionary.

15. The method of claim 12 further comprising using the classification to configure an acoustic model.

16. A method of determining which of a plurality of pronunciations of a word in a phonetic dictionary to use in speech synthesis, the method comprising:
determining a text word to synthesize, the text word having multiple known pronunciations;
looking up, in a user profile, a preferred pronunciation of a profile word that has multiple known pronunciations;
calculating a correlation between the preferred pronunciation of the profile word and each of multiple pronunciations of the text word; and
choosing one of the multiple pronunciations of the text word at least partially based on its correlation to the preferred pronunciation of the profile word.

17. The method of claim 16 further comprising:
looking up, in the user profile, a preferred pronunciation of a second profile word that has multiple known pronunciations; and
calculating a correlation between the preferred pronunciation of the second profile word and each of the multiple pronunciations of the text word.

18. A method of configuring a phonetic dictionary, the method comprising:
analyzing, across a multiplicity of users, user's profile word lists for a plurality of pronunciations of at least one word recognized with multiple pronunciations;
determining, based on the analysis, that a pronunciation most frequently used across the multiplicity of users is a preferred one of the plurality of pronunciations; and
update the phonetic dictionary to indicate the preferred one of the plurality of pronunciations for speech recognition.

19. The method of claim 18 further comprising determining, based on the analysis, an order of preference of each of the plurality of pronunciations.

20. The method of claim 18 wherein the analysis only considers users within a particular class.

21. A method of improving the accuracy of automatic speech recognition, the method comprising:
determining, by a speech engine, a multiplicity of phoneme sequence hypotheses from a spoken utterance;
determining, by the speech engine, a multiplicity of transcription hypotheses, each transcription hypothesis being based on:
a match between the phoneme sequence hypothesis and a pronunciation of a word in a phonetic dictionary, the word having a plurality of pronunciations; and
an indication of at least one pronunciation being preferred, wherein the preferred pronunciation is determined by frequency of usage determined by crowdsourcing; and
calculating a likelihood score for each transcription hypothesis, the likelihood score being positively correlated to the matched pronunciation being the preferred pronunciation of the word.

* * * * *